US009021556B2

(12) United States Patent
Youngworth

(10) Patent No.: US 9,021,556 B2
(45) Date of Patent: *Apr. 28, 2015

(54) SYSTEM AND METHOD FOR VIRTUAL DEVICE COMMUNICATION FILTERING

(75) Inventor: Christopher Youngworth, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 685 days.

This patent is subject to a terminal disclaimer.

(21) Appl. No.: 12/713,754

(22) Filed: Feb. 26, 2010

(65) Prior Publication Data

US 2011/0126269 A1    May 26, 2011

Related U.S. Application Data

(60) Provisional application No. 61/263,761, filed on Nov. 23, 2009.

(51) Int. Cl.
*G06F 15/16* (2006.01)
*G06F 21/74* (2013.01)
*G06F 9/455* (2006.01)

(52) U.S. Cl.
CPC ............ *G06F 21/74* (2013.01); *G06F 9/45558* (2013.01); *G06F 2009/45587* (2013.01)

(58) Field of Classification Search
CPC ................ G06F 21/74; G06F 9/45558; G06F 2009/45562; G06F 2009/45533; G06F 9/455
USPC ............................................ 726/4, 17; 718/1
See application file for complete search history.

(56) References Cited

U.S. PATENT DOCUMENTS

| | | | |
|---|---|---|---|
| 8,341,732 B2 | 12/2012 | Croft et al. | |
| 8,458,717 B1 * | 6/2013 | Keagy et al. .................. | 718/104 |
| 2006/0069828 A1 | 3/2006 | Goldsmith | |
| 2006/0248528 A1 * | 11/2006 | Oney et al. ........................ | 718/1 |
| 2008/0082977 A1 * | 4/2008 | Araujo et al. ...................... | 718/1 |
| 2008/0104589 A1 * | 5/2008 | McCrory et al. .................. | 718/1 |
| 2008/0134177 A1 * | 6/2008 | Fitzgerald et al. ................ | 718/1 |
| 2008/0163207 A1 * | 7/2008 | Reumann et al. ................. | 718/1 |
| 2009/0070771 A1 * | 3/2009 | Yuyitung et al. .............. | 718/105 |
| 2009/0276774 A1 | 11/2009 | Kinoshita | |
| 2010/0050172 A1 * | 2/2010 | Ferris ................................ | 718/1 |
| 2010/0100718 A1 * | 4/2010 | Srinivasan ........................ | 713/1 |
| 2010/0107162 A1 * | 4/2010 | Edwards et al. .................. | 718/1 |
| 2010/0122248 A1 * | 5/2010 | Robinson et al. ................. | 718/1 |
| 2010/0235647 A1 * | 9/2010 | Buer .............................. | 713/187 |
| 2010/0257602 A1 | 10/2010 | Kettler et al. | |
| 2010/0333088 A1 | 12/2010 | Rogel et al. | |
| 2011/0126268 A1 | 5/2011 | Youngworth | |

OTHER PUBLICATIONS

Diakhate et al. "Efficient Shared Memory Message Passing for Inter-VM Communications." Springer Verlag, Mar. 17, 2009, 10 pages.

* cited by examiner

*Primary Examiner* — Harunur Rashid
(74) *Attorney, Agent, or Firm* — Wilmer Cutler Pickering Hale and Dorr LLP

(57) ABSTRACT

Embodiments of the present invention are directed to a method and system for virtual device communication filtering. The method includes receiving, within an electronic system, an instantiation request for a first virtual device and determining whether the first virtual device and a second virtual device are allowed to communicate based on an authorization record datastore. The method further includes modifying an authorization record of the authorization record datastore. The modifying comprises setting an indicator of a data filtering module to filter communication between the first virtual device and the second virtual device. A response can then be sent to the instantiation request.

17 Claims, 12 Drawing Sheets

900

Receiving A Notification Of An Emulated Device Operable To Be Provisioned
902

Updating An Authorization Record Of An Authorization Record Datastore
904

Receiving A Request For Reconnection Of The Emulated Device With A Virtual Device
906

Determining Whether The Emulated Device And The Virtual Device Are Allowed To Communicate Based On The Authorization Record Datastore
908

Determining Whether To Insert A Filter Based On The Authorization Record
910

Sending A Response To The Request For Reconnection
912

Receiving An Instantiation Request For A First Virtual Device
1002

Determining Whether The First Virtual Device And A Second Virtual Device Are Allowed To Communicate Based On An Authorization Record Datastore
1004

Modifying An Authorization Record Of The Authorization Record Datastore
1006

Sending A Response To The Instantiation Request
1008

Fig. 10

SYSTEM AND METHOD FOR VIRTUAL DEVICE COMMUNICATION FILTERING

RELATED U.S. APPLICATIONS

This application claims the benefit of and priority to the provisional patent application Ser. No. 61/263,761, entitled "SEAMLESS INSERTION OF DATA TRANSFORMATIONS INTO DEVICE DRIVER TRANSPORT STREAMS," with filing date Nov. 23, 2009, and hereby incorporated by reference in its entirety.

CROSS REFERENCE TO RELATED U.S. APPLICATIONS

This Application is related to the U.S. Patent Application "SYSTEM AND METHOD FOR AUTHORIZATION AND MANAGEMENT OF CONNECTIONS AND ATTACHMENT OF RESOURCES", by Youngworth, filed on Feb. 26, 2010, Ser. No. 12/713,640, now U.S. Pat. No. 8,627,413, which is incorporated by reference in its entirety.

This Application is related to the U.S. Patent Application "DISTRIBUTED STORAGE THROUGH A VOLUME DEVICE ARCHITECTURE", by Youngworth, filed on Feb. 26, 2010, Ser. No. 12/713,621, now U.S. Pat. No. 8,438,360, which is incorporated by reference in its entirety.

TECHNICAL FIELD

Embodiments of the present invention generally relate to digital computer systems and virtualization.

BACKGROUND

As technology advances, computing systems have become increasingly powerful in terms of computation power. Correspondingly, the power requirements have increased rapidly. As a result, virtualization of computers and/or operating systems has become increasingly important to enable server consolidation such that many small physical servers can be replaced by one larger physical server. This results in increased and more efficient utilization of costly hardware resources such as central processing units (CPUs), thereby allowing power savings and hardware cost savings.

Virtual environments typically include virtualized computers and/or operating systems known as virtual machines or guests which access hardware or physical resources through emulated devices presented by a hypervisor. Hypervisor based virtualization is becoming increasingly important in data centers and furthermore hypervisor based computing is displacing many native platform applications. However, hypervisor based virtual environments are often rendered less effective by the primitive emulated devices provided by the hypervisors. Particularly, the hypervisor vendors are not sufficiently motivated to make the proper interfaces available to allow proper porting of products to a hypervisor based virtualization environment. The lack of supporting interfaces prevents hypervisor based implementations from delivering performance at optimum levels.

In addition, solutions attempting to use device drivers on top of the existing hypervisor infrastructure require custom implementations of interfaces to hypervisor internal interfaces. Also, within these systems, the performance of working through an emulated device layered software stack is significantly degraded and the system resource overhead is greatly increased. Consequently, the cumulative demand on shared hardware resources by multiple guests makes response time and throughput largely indeterminate.

Further, current hypervisors expose device specific characteristics to virtual machines which make virtual machine migration difficult. Virtual machines are designed to be portable. Virtual machines can be moved or migrated between platforms and therefore the resources that underlie the emulated devices of the hypervisors can vary. Modern hypervisors have incomplete abstractions defining the resources that are needed to construct the emulated devices presented to the virtual machines. As a result, individual physical resource characteristics creep into the implementations of emulated devices. This leads to difficulties in substituting one physical resource for another, during virtual machine migration, without affecting the capabilities of the emulated device presented to the virtual machine guest. As such, each resource difference is handled individually. The results are hard to maintain code, little code re-use, and difficulty in maintaining common functions and metrics across the disparate implementations. This means that often the guest driver must be changed after migration or that the transport channel is sub-optimal in performance.

Often, hypervisor vendors try to overcome their device model shortcomings by limiting the number of device emulations, relying on internet protocol (IP) network abstraction to supply storage as well as network communication to the virtual machine. This is not optimal because packet networking is not the optimal transport abstraction for internal use and limitations of device types exported to a virtual machine slow the adoption of the virtualization platform.

SUMMARY OF THE INVENTION

Accordingly, embodiments of the present invention provide systems and methods to authorize, provision, and filter virtual device communication. The authorization provides dynamic security and mandatory access control. The provisioning is transparent to the devices thereby allowing dynamic provisioning. The filtering allows a variety of data filtering functions to be applied in a manner transparent to the virtual devices.

In one embodiment, the present invention is implemented as a method for setting up data filtering. The method includes receiving, within an electronic system, an instantiation request for a first virtual device and determining whether the first virtual device and a second virtual device are allowed to communicate based on an authorization record datastore. The method further includes modifying an authorization record of the authorization record datastore. The modifying comprises setting an indicator of a data filtering module to filter communication between the first virtual device and the second virtual device. A response can then be sent to the instantiation request.

In another embodiment, the present invention is implemented as a computer readable storage medium having stored thereon, computer executable instructions that, if executed by a computer system cause the computer system to perform a method including receiving an instantiation request for a first virtual device and determining whether the first virtual device and a second virtual device are allowed to communicate based on an authorization record datastore. The method further includes modifying an authorization record of the authorization record datastore. The modifying comprises setting an indicator of a data filtering module to filter communication between the first virtual device and the second virtual device. A response can then be sent to the instantiation request.

In yet another embodiment, the present invention is implemented as a storage cluster system comprising a computer system having one or more processors coupled to a computer readable storage media and executing computer readable code which causes the computer system to implement a process including receiving an instantiation request for a first virtual device and determining whether the first virtual device and a second virtual device are allowed to communicate based on an authorization record datastore. The method further includes modifying an authorization record of the authorization record datastore. The modifying comprises setting an indicator of a data filtering module to filter communication between the first virtual device and the second virtual device. A response can then be sent to the instantiation request.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

FIG. 9 shows an exemplary flowchart of computer controlled processes for virtual device provisioning, in accordance with embodiments of the present invention.

FIG. 10 shows an exemplary flowchart of computer controlled processes for setting up data filtering, in accordance with embodiments of the present invention.

DETAILED DESCRIPTION

Figure 1:
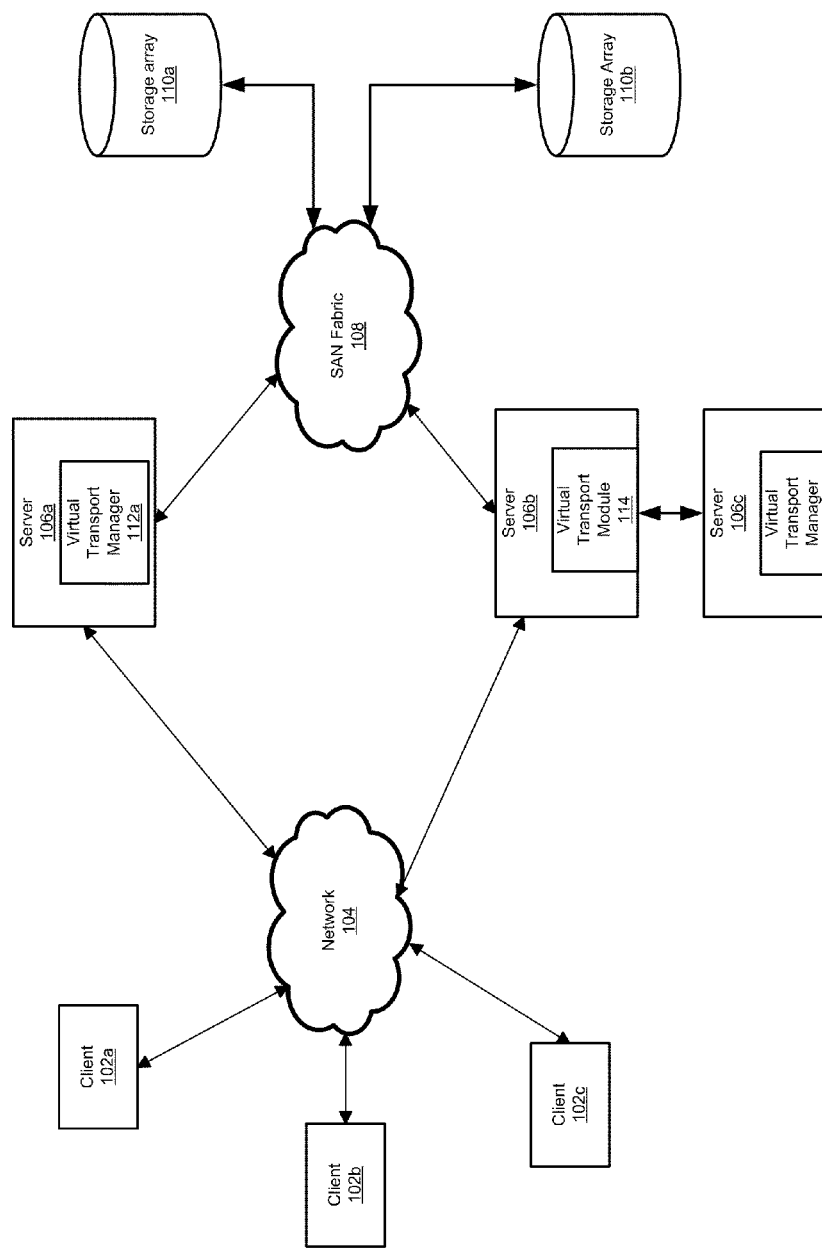
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail to avoid unnecessarily obscuring aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is that appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes clients 102a-c, networks 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers (e.g., billing). For example, applications and servers might have thousands of people accessing them from different locations, thus the applications and servers need to be highly available and the cluster fault tolerant. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

Servers 106a and 106c respectively execute virtual transport managers 112a-b which manage virtual transport and authorization of communication between virtual machines and virtual devices of servers 106a-c. Virtual transport managers 112a-b are further operable to abstract devices and other resources with respect to virtual machines on servers 106a-c. Virtual transport managers 112a-b may also present resources of from different servers to each of servers 106a-c. Each resource presented via virtual transport managers 112a-b in conjunction with virtual transport module 114 is treated as a remotable resource such that resource changes are transparent to virtual machines running on servers 106a-c.

Virtual transport manager 112b is communicatively coupled with virtual transport module 114. In one embodiment, virtual transport managers 112a-b are operable to manage and authorize virtual devices of other systems. For example, virtual transport manager 112b manages virtual transport and authorization of devices between virtual machines and virtual devices of server 106b via virtual transport module 114.

Figure 2:
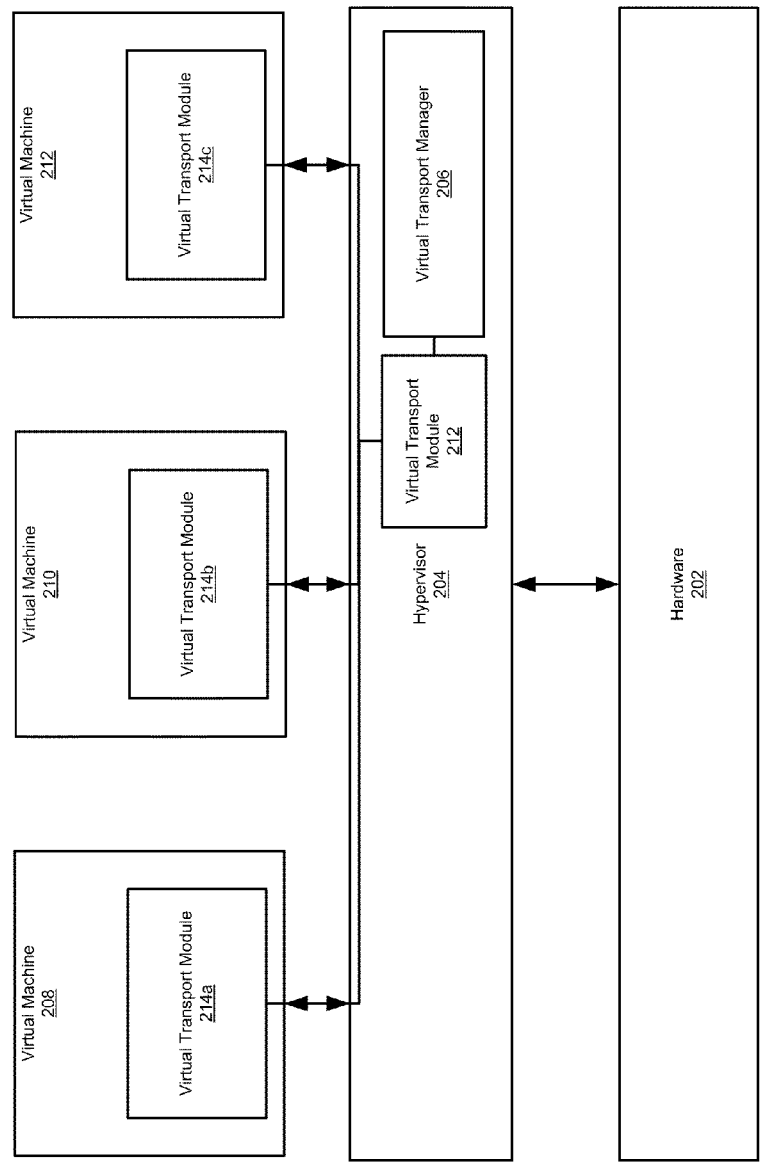
FIG. 2 shows a block diagram of an exemplary virtual environment, in accordance with one embodiment of the present invention.

FIG. 2 shows a block diagram of an exemplary virtual environment, in accordance with one embodiment of the present invention. Exemplary virtual environment 200 includes hypervisor 204 and virtual machines 208-212. Components of exemplary virtual environment 200 may execute on or otherwise be part of computing systems (e.g., servers 106a-c and computing system 1000).

Hypervisor 204 interfaces with hardware 202 (e.g., of servers 106a-c or computing system 1000) and provides resources and services to virtual machines 208-212. In one embodiment, hypervisor 204 is part of a trusted computing base (TCB). Hypervisor 204 includes virtual transport module 212 and virtual transport manager 206. Virtual transport manager 204 in conjunction with virtual transport 212 and virtual transport modules 214a-c, of virtual machines 208-212, provide abstractions including emulated devices of resources in hardware 202 to virtual machines 208-212.

In one embodiment, virtual transport module 212 and virtual transport manager 206 provide an independent input/output (IO) abstraction layer to abstract the physical IO bus from virtual machines 208-212 which allows implementation of controls over IO abstraction layer. Virtual transport module 212 provides emulated devices or abstractions of resources of hardware 202. Virtual transport manager 206 and virtual transport module 212 support a variety of functions including data filtering, device remoting or provisioning, and security through authorization of connections between virtual machines 208-212 and abstractions of resources of hardware 202.

Figure 3:
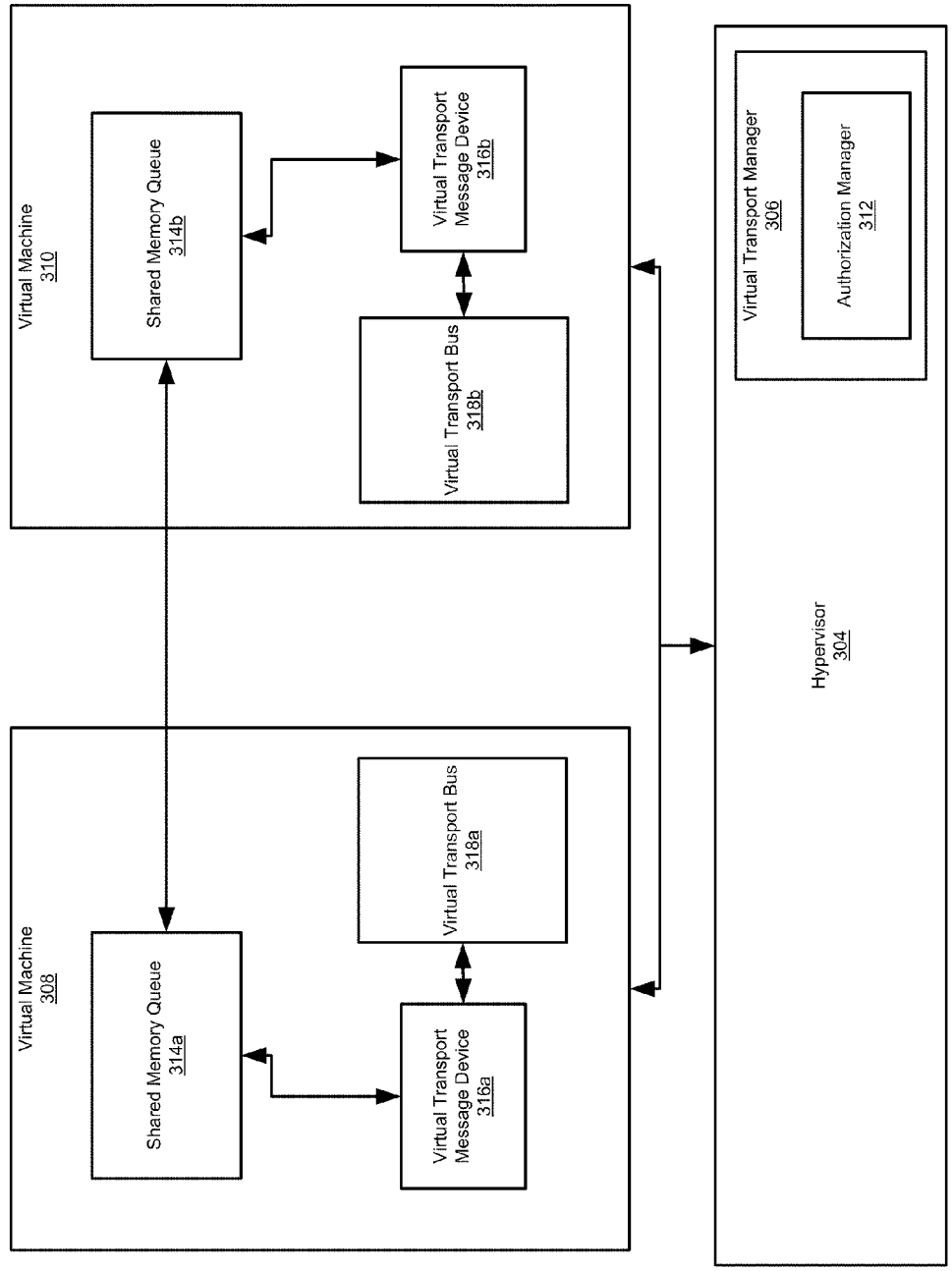
FIG. 3 shows a block diagram of exemplary guest components, in accordance with one embodiment of the present invention.

FIG. 3 shows a block diagram of exemplary guest components, in accordance with one embodiment of the present invention. FIG. 3 shows a peer to peer, or guest to guest connection. In guest to guest communications, a guest substitutes for the hardware resource backed virtual device. All endpoints guest or hardware resource backed have security profiles, are identified by UUID's and are subject to the Authorization Manager's security policy. Diagram 300 includes hypervisor 304 and virtual machines 308-310. Hypervisor 304 includes virtual transport manager 306. In one embodiment, hypervisor 304 is part of a trusted computing base (TCB).

Virtual transport manager 306 includes authorization manager 312. Guests 308 and 310 include shared memory queues 314a-b, virtual transport message devices 316a-b, and virtual transport bus modules 318a-b, respectively. The virtual transport buses 318a-b abstract software communication for a device (e.g., virtual transport devices 316a-b). In one embodiment, the virtual transport bus modules 318a-b are embedded in hypervisor 304 and are part of the trusted computing base (TCB). Guests 308-310 communicate via shared memory queues 314a-b after authorization manager 312 checks whether virtual transport message devices 316a-b are allowed to communicate.

Virtual transport manager 306 provides for a virtual transport and bus subsystem that plugs into hypervisor 304. The subsystem provides a means to create emulated devices based on any subset of resources available in the hypervisor 304 and presents these devices to virtual machines 308 and 310. Endpoints (e.g., virtual machines 308-310) are able to request connections allowing the support of services as well as traditional bus plug events. The virtual transport manager is so called because it shields the nature of the transport of data. While it may export a shared memory paradigm, the method of its implementation allows any sort of actual transport, e.g., shared RAM, reflective shared memory, network based emulation for remote endpoints and so on.

Virtual transport manager 306 presents device emulations to virtual machine operating systems in the form of pluggable devices. The emulated devices can be identified, constructed, authorized and configured. These devices can be dynamically attached during runtime at the request of the guest or at the request of a remote endpoint trying to connect to the guest. Either end point is free to refuse a connection.

In one embodiment, the virtual transport manager 306 provides a mechanism to download device emulation libraries. Device emulation libraries can be downloaded at anytime in the virtual machine lifecycle. Device emulation libraries contain virtual device identifiers that are passed during virtual transport bus discovery, thereby making it possible for custom built drivers in a virtual machine to be loaded.

In one embodiment, virtual machine 308 makes an instantiation request to virtual transport bus module 318a. The request has parameters including for instance device type (e.g., virtual transport message device) and end points (e.g., virtual machines 308 and 310). In one embodiment, the request goes on the virtual transport bus configuration queue. Device instantiation requests or device plug events can be initiated by virtual transport manager 306 or by the virtual machines 308 and 310. In this way, a virtual machine can request a connection to an endpoint with a particular set of properties. An endpoint can be another guest, or a piece of hardware abstracted by virtual transport manager 306. The ability of endpoints to initiate a plugging event allows the capability for supporting dynamic service attachment. In one embodiment, instantiation requests require a response, and no instantiation request can be made while one is outstanding. Thereby, in this way lock-step state update is assured and either side can start a configuration action without contamination from stale information with respect to earlier requests.

The authorization manager 306 provides a front-end to manage resource allocation and communication channels for a virtual machine and its external resources that operates in conjunction with a virtual transport bus. Virtual transport bus 318a signals authorization manger 312 with the request parameters to determine if the two end points are authorized to communicate. Authorization manager 312 checks for an authorization record that matches the device type and the end points. In one embodiment, authorization records allow authorization manager 306 to provide mandatory access control that is not tied to a specific hypervisor implementation or interface and independent of external hypervisor specific virtual machine interfaces. Authorization records may include routing information, security characteristics of endpoints, and quality of service (QoS) characteristics, including throughput and latency.

The endpoints, whether virtual machines or virtual transport manager represented hardware resources are identified by universally unique identifiers (UUIDs). This allows authorization manager 306 to manipulate endpoints within a global security context. Authorization manger 306 can also check for connection to remote services and devices and thereby supports automatic routing. As described further herein, authorization manager 306 is operable to determine whether data filtering is necessary to ensure maintenance of desired security levels.

In one embodiment, authorization manager 312 is a separate entity that has a cache disposed local in the trusted computing base and has access out of the local trusted computing base. The authorization manager 312 may be co-resident or attached across a secure channel to virtual transport manager 306.

As further described herein, authorization manager 312 is operable to manage device connections for a virtual machine and provision devices. Instantiation may be initiated at the end points (e.g., virtual machines) but is controlled through the authorization manager 312. The authorization manager determines based on the merits of an instantiation request by reviewing the provisioning record in its database. If no record is found or if the capabilities requested exceed the provisioning record authorization, the request is denied.

Upon a match of the parameters of the request with an authorization record, the connection is authorized. Authorization manager 312 can deny all access that is not explicitly requested. Accordingly, authorization manager 312 allows access based on if there is an explicit record indicating that the guest and its remote endpoints and the particular type of device are accepted. If all I/O is managed via authorization manager 312 and the physical devices employed conform to the security profile, authorization manager 312 can enforce mandatory access control and full level based security between endpoint elements.

The connection authorization allows virtual machines 308 and 310 to communicate via shared memory queues 314a-b. In one embodiment, shared memory queues 314a-b represent a single portion of shared memory used by virtual machines 308 and 310 to communicate. In one embodiment, the virtual transport bus emulation is resident in the hypervisor and made visible to the guest via a virtual transport device (e.g., virtual transport message device 316a) plugged into the virtual machine's system bus.

Exemplary Filtering Configuration

Figure 4:
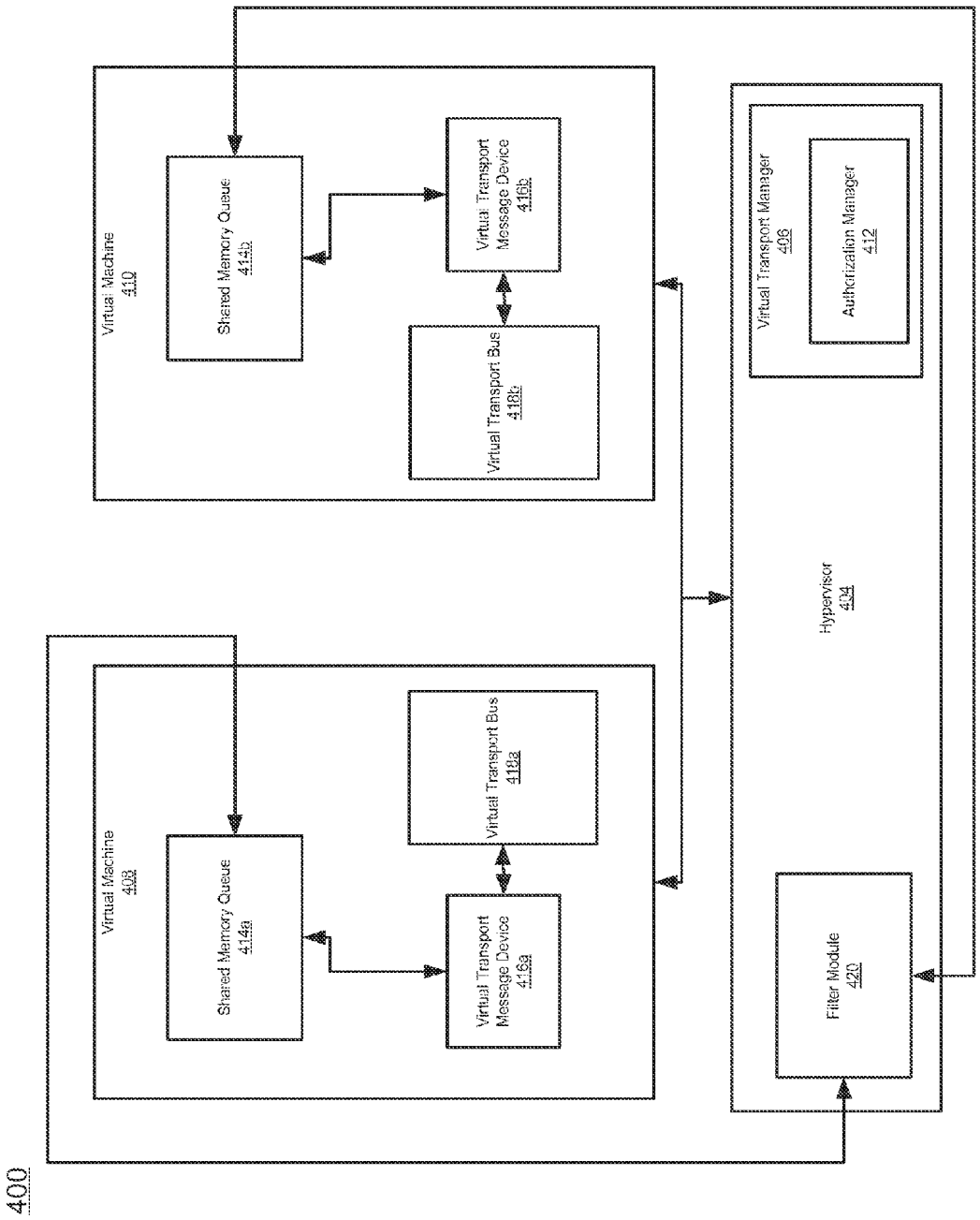
FIG. 4 shows a block diagram of an exemplary filtering configuration, in accordance with one embodiment of the present invention.

FIG. 4 shows a block diagram of an exemplary filtering configuration, in accordance with one embodiment of the present invention. In one embodiment, exemplary filtering configuration 400 is similar to exemplary guest components diagram 300. For example, virtual machines 408-410 and hypervisor 404 are similar to virtual machines 308-310 and hypervisor 304. One difference to note is that hypervisor 404 includes filter module 420 which communicatively couples shared memory queues 414a-b.

Embodiments of the present invention provide a transport filter framework to plug system services and data transformations into the IO path of devices exposed through the virtual transport framework. More specifically, embodiments of the present invention are operable to support insertion of device filters in between the endpoints of a virtual transport device connection. The filter insertions are hidden from the driver endpoints and the core device emulation. Virtual transport filters work with any type of virtual transport device, local, remote, or physically backed. A variety of system services may be employed through virtual transport filters and includes data auditing for high end security, virus filtering, authentication and encryption of data, and data compression. That is, filter insertion is transparent to the two end points. Another benefit of the virtual transport approach is in the scalability of hardware support. The individual elements of a software stack can all be executed on a single system or be tied together across a network or bus connections to separate hardware engines.

It is appreciated that the mechanism designed to effect filter insertion is different from the mechanism used to connect a remote device. In the remote case, a virtual bus hypervisor module exists at either end and only the manipulation of the transport is involved. In the case of filtering, the data content is subject to transform.

Virtual transport offers a mechanism by which filters may be added to a device communication path at any time without the need for forethought on the part of the device emulation or device driver writer. Further, this capability is dynamic. A filter can be added on a running system and a filter can be added on a running driver. Virtual transport accomplishes this by abstracting data transport through its universal shared memory queue mechanism.

The virtual transport bus discovery method, the universal transport support, the authentication framework and the routing mechanisms make it possible to insert data filters in the transport path through a rerouting of device driver queue traffic. Any point between virtual transport components that are connected through the queue mechanism can be targeted. Any number of filters may be added to a data path. In one embodiment, filter modules may be written that are specific to a device or group of devices.

In one embodiment, filter insertion is based on the substitution of a device emulation when an attempt to plug is made. The policy regarding substitution is carried out via authorization manager 412 that is consulted by the virtual transport bus emulation. In order to plug a device, an authorization record must exist which matches the endpoints and the device type requested. In addition, authorization manager 412 can insert record modifiers that indicate that a data filter module should be employed at the direction of auxiliary fields in the authorization record.

During an authorization check initiated by an instantiation request, authorization manager 412 may determine whether communication between virtual machines 408 and 410 may need to be filtered (e.g., compressed, audited, encrypted, backup, virus filtering, etc.). For example, where virtual machines 408 and 410 are on different security levels (e.g., different networks of different levels of security), filter module 420 may encrypt the data stream between shared memory queues 414*a-b*. Filters allow the administrator to change the characteristics of a device to suit changed data center circumstances without impacting either the device or the virtual machine.

In one embodiment, filter insertion is based on access to transport queue content (e.g., shared memory queues 414*a-b*) and a wrapping of the virtual transport bus interface routines. These routines include the calls to virtual transport bus services and the callbacks registered by the target's emulated device when its device emulation library is loaded.

Filter module insertion into the transport path is made possible by the basic abstraction of the queue. The queue internal structure and protocol can vary therefore a mechanism of filter module 420 exists to communicate with the queue type. Access to queue library support also extends to filter modules, allowing a filter to access queue data via the virtual transport shared queue library. The filter can determine the types of queue handles associated with the targeted device via the emulated device's discovery routine. In one embodiment, the queue protocol may be changed but the method by which the queue is accessed by the driver and device emulators is fixed in virtual transport interfaces. This allows for changing of queue access libraries.

The act of insertion further requires export of the callback table of a device instance to the filter code. At the time the filter module is loaded into the hypervisor, the filter module 420's device library is registered with the virtual transport bus emulation module. One of its actions is to request that the registered callbacks of the device to be filtered. Utilization of the filter may be based on ordered updating of the management controlled virtual transport authorization record that is associated with the targeted device emulations.

With an altered authorization record, the filter module device emulation library will now be called on device instantiation instead of the targeted device. Filter callback module routines for create, query, etc., will in turn call the targeted device callbacks appropriately to set up the expected communication paths to the targeted device. The targeted device emulation does not need to be aware that a filter is now between it and the guest, or between it and the remote device.

It is a characteristic of the virtual transport bus protocol that all of the callbacks for virtual bus functionally are provided on the device creation call or connection call. This makes it possible for the filter to connect itself to the front or the back of the device. When filter module 420 is inserted in front (e.g., between the device driver and the targeted device emulation), filter module 420 filters back the creation, query, and queue registration events. When filter module 420 is inserted in the back (e.g., between the targeted device and the virtual transport bus), filter module 420 filters the callbacks provided to the targeted emulation by the virtual bus.

Figure 5:
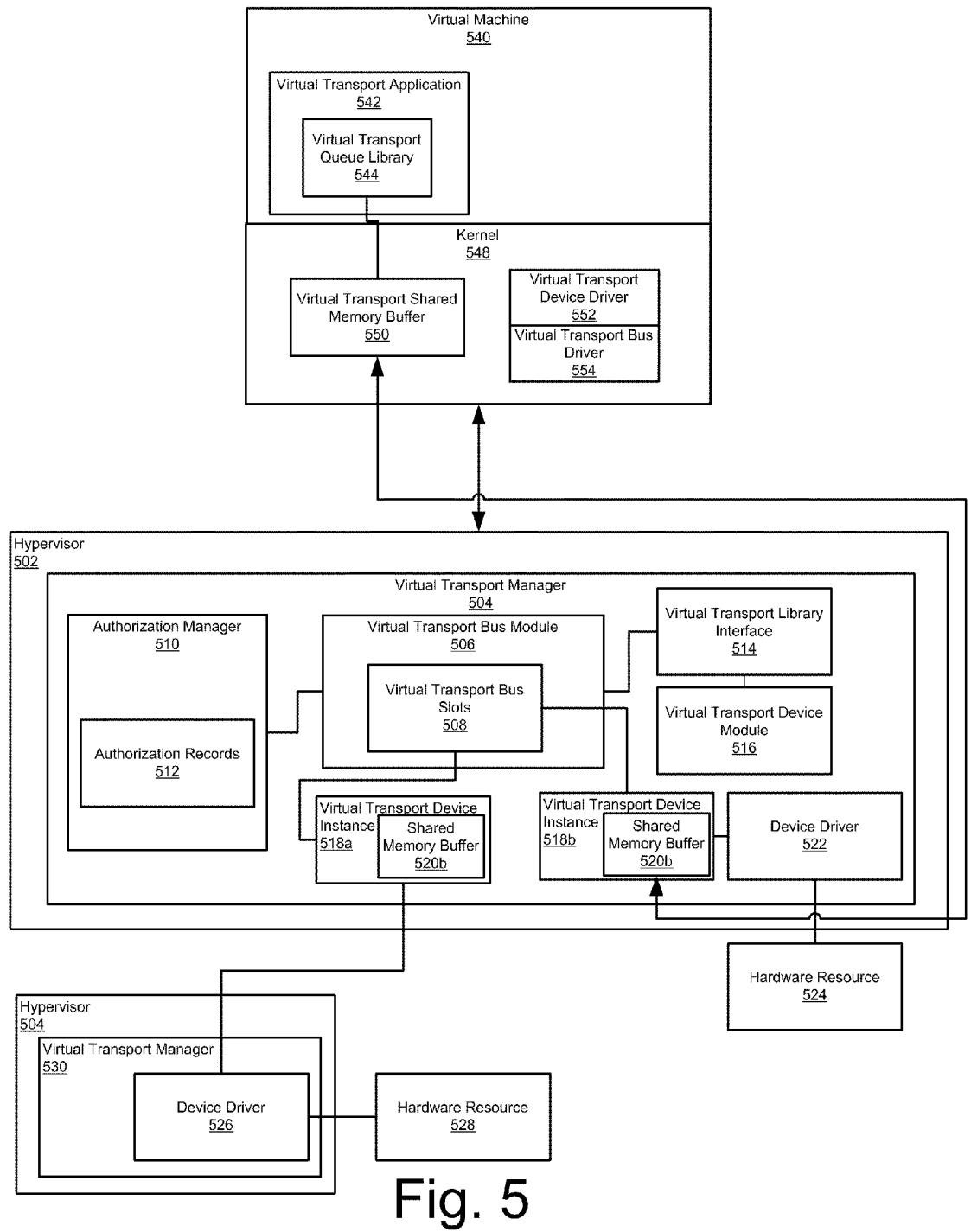
FIG. 5 shows a block diagram of exemplary hypervisor and guest components, in accordance with another embodiment of the present invention.

FIG. 5 shows a block diagram of exemplary hypervisor and guest components, in accordance with another embodiment of the present invention. Diagram 500 includes hypervisor 502, hypervisor 504, and virtual machine 540. In one embodiment, hypervisors 502 and 504 are similar to hypervisor 204, 304, and 404.

Virtual machine 540 includes virtual transport application 542 and kernel 548. Virtual transport application 542 includes a virtual transport queue library. Kernel 548 includes virtual transport shared memory buffer 550, virtual transport device driver 522, and virtual transport bus driver 554.

Hypervisor 502 includes virtual transport manager 504 and is communicatively coupled to hardware resource 524 and hypervisor 504. Hypervisor 504 includes virtual transport manager 530 and is communicatively coupled to hypervisor 504 and hardware resource 528. Hypervisor 504 may reside on a separate computing system.

Virtual transport manager 504 includes authorization manager 510, virtual transport bus module 506, virtual transport library interface 514, virtual transport device module 516, virtual transport device instances 518*a-b*, and device driver 522. As described herein, authorization manager 510 uses authorization records 512 to determine whether to authorize connections between end points. For example, virtual machine 540 issues an instantiation request via virtual transport application 542 which signals virtual transport device driver 552. In one embodiment, the instantiation request includes the UUID of virtual machine 540 as a first endpoint, virtual transport device instance 518*b* as a second endpoint, and a device type corresponding to virtual transport device instance 518b. Virtual transport device driver 552 sends the instantiation request to virtual transport bus driver 554 which sends the instantiation request virtual transport bus module 506. Virtual transport bus module 506 sends the instantiation request to authorization manager 510 which checks the parameters of the instantiation request against authorization records 512. If no authorization record matching the instantiation request is found, the instantiation request is denied.

Upon finding a record matching the parameters of the instantiation request, authorization manager 510 signals that the virtual transport application 542 can communicate with virtual transport device instance 518b. Virtual machine 540 then sets up virtual transport shared memory buffer 550 which is used to communicate with the virtual transport device instance 518b via shared memory buffer 520b. In one embodiment, virtual transport shared memory buffer 550 and shared memory buffer 520b are the same portion of shared memory. Requests (e.g., "get" and "put" requests) are sent from virtual transport application 542 with the use of virtual transport queue library 544. The requests are transferred via virtual transport shared memory buffer 550 and shared memory buffer 520b. The request then travel to device driver 522 and then to hardware resource 524.

In one embodiment, shared memory queues are set up between the virtual transport bus driver 554 and the virtual transport bus module 506 in hypervisor 502 during the bus discovery actions (e.g., instantiation request). Via use of shared memory buffers 550 and 520b, each virtual machine coupled to virtual transport manager 504 has a dedicated communication channel apparatus within the virtual transport manager 504. Virtual machine 540 sends device requests such as device create or instantiation requests, device destroy, and a bus state transition request detailing the nature of virtual machine 540's connection to the bus.

Virtual transport manger 504 is unique in its communication abstraction of between the device and the virtual transport bus. The resources used for communication include communication buffers (e.g., shared memory), interrupts, and signals. These resources are used as the base functionality to export a list of interfaces that isolate virtual transport devices from the hypervisor implementations on which the virtual transport bus emulation resides. Virtual transport also supports a device emulation abstraction that allows third parties to develop device emulations that can be downloaded into the virtual bus. For example, device emulation libraries maybe downloaded into virtual transport library interface 514. All device code written on top of virtual transport manager 504 is independent of hypervisor functions for guest to hypervisor communication.

In one embodiment, each virtual transport device emulation communication with virtual machine 540 is based on shared memory, or device memory buffers except for virtual bus configuration actions. The queue mechanisms are discovered via an extended virtual bus/device discovery mechanism. Interrupts and signals are all abstracted by the virtual transport bus module 506 which provides bus emulation. In this way, virtual transport device emulations are isolated from hypervisor guest communication implementations.

The queue protocols sitting inside of the shared buffers are driver specific, though a mechanism to initialize these queues is supported. In the default queue library support, virtual transport establishes a set of queue access conventions. In this manner, the general queue abstraction can be used to support all manner of shared memory and device memory queue protocols without requiring changes to the guest's application services.

The virtual transport bus card emulation of virtual transport device instance 518b has a shared memory buffer 520b communication channel that is opened by virtual transport device driver 552 in the virtual machine 540. Requests to create new virtual devices are passed though the shared memory buffer 520b communication channel. Virtual transport device driver 552 in virtual machine 540 sends a request and virtual transport bus module 506 provides the emulations and connections to hardware. The device emulations of virtual transport bus 506 are manifested through shared memory queues, interrupt driven callbacks, and virtual transport bus resident signals.

As both virtual transport bus module 506 and authorization manager 510 are in the trusted computing base of hypervisor 502, communication between virtual transport bus module 506 and authorization manger 510 is over a secure connection. Accordingly, the authorization activity meets the criteria of secure mandatory access control. In one embodiment, authorization manager 510 is not tied to hypervisor 502 and only interacts with the virtual transport bus module.

In one embodiment, an effective method of communication with low overhead is a variant on a shared memory queue with a signal. The shared queue variant may be implemented in an indefinite variety of styles but optimal versions have certain characteristics including support for streaming data where steady state transfers do not require a signal and accesses to receivers and senders are reduced to 'get' and 'put' interfaces.

Since the virtual transport device driver 552 is shielded from the queue format, it is possible for virtual transport device driver 552 to support a variety of queue implementations by selecting different queue libraries. The queue library can be chosen at device discovery time. Using this method, a filter module is able to signal to a virtual transport device driver through the discovery mechanism about which queue library to load. For many devices the library may not need to substitute queue implementations, but for the cases where it is necessary, the queue abstraction preserves component isolation.

Virtual transport library interface 514 and virtual transport device module 516 facilitate adding new devices. In one embodiment, downloads into hypervisor 502 may be done to add device libraries to the virtual transport bus module 506 via downloads into virtual transport library interface 514. The device libraries of virtual transport library interface 514 are available as soon as the virtual transport device instance 518b calls the virtual transport bus module 506 to register its call back table.

In one embodiment, authorization manager 512 is a separate service. Authorization manager 510 exports interfaces for remote virtual transport provisioning and management of throughput and latency characteristics of provisioned devices. Further, authorization manager 510 models its security on the notion of a virtual machine as a black box with input/output (IO) determined by tightly defined security analysis of the remote endpoints. Authorization manager 510 provides mandatory access control by identifying all endpoints and labeling them. It is noted that since all endpoint/device pairings require an explicit authorization record in authorization records 512, the virtual transport subsystem satisfies the strictest security criteria.

Exemplary Device Provisioning

Figure 6:
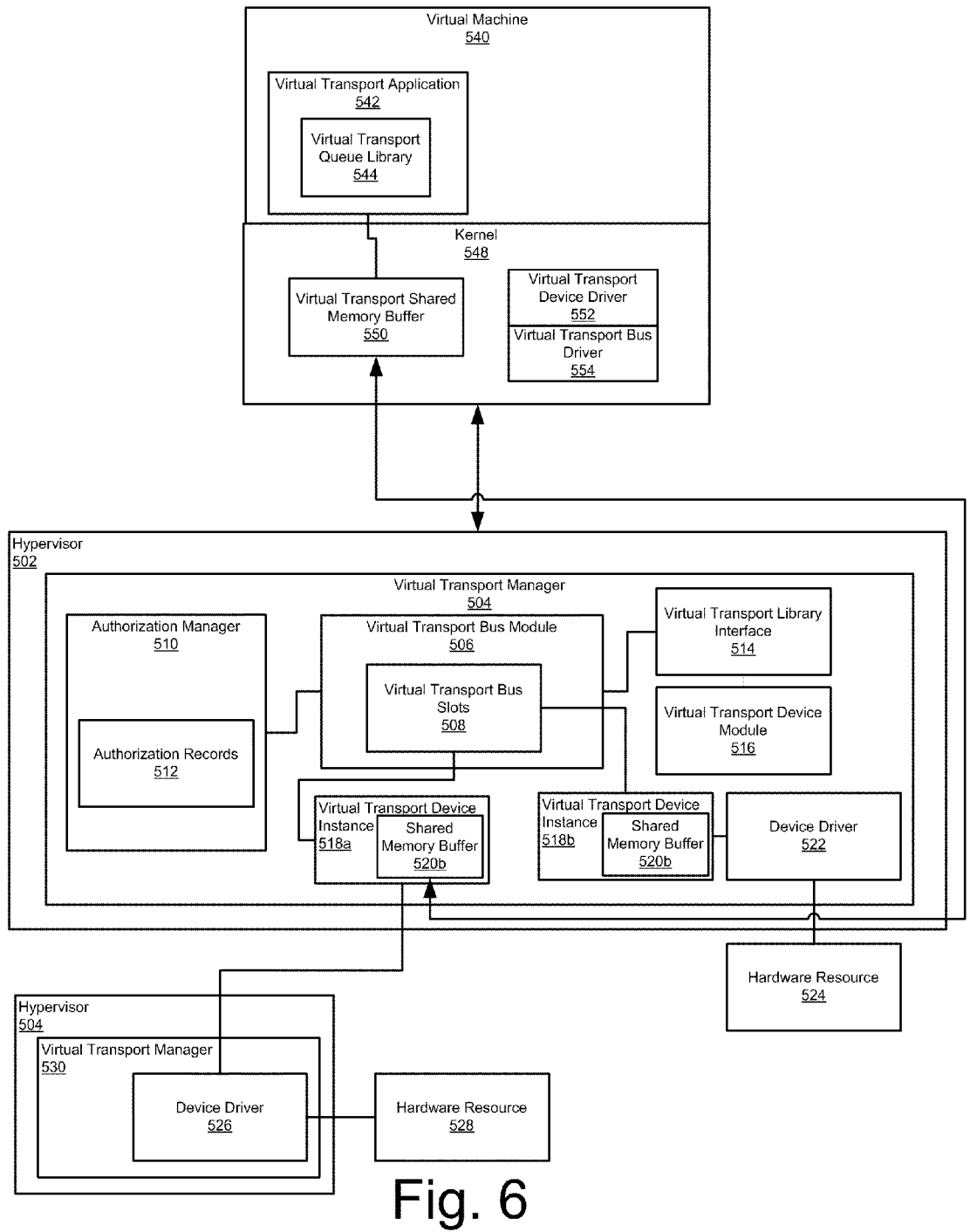
FIG. 6 shows a block diagram of exemplary hypervisor and guest components after the provisioning of a device, in accordance with another embodiment of the present invention.

FIG. 6 shows a block diagram of exemplary hypervisor and guest components after provisioning of a device, in accordance with another embodiment of the present invention.

Embodiments of the present invention are operable to perform transparent redirection of device provisioning to support remote provisioning. The remote provisioning may occur for instance when virtual machines are migrated among systems (e.g., migrated among hypervisors) or based on a need to change usage to different resources (e.g., administrator decisions, load balancing, etc.).

In one embodiment, diagram 600 of exemplary hypervisor and guest components is similar to diagram 500 of exemplary hypervisor and guest components except that virtual transport shared memory buffer 550 of virtual machine 540 is communicatively coupled to virtual transport device instance 518a via shared memory buffer 520b. Remote hardware resource 528 was substituted for the hardware resource 524.

Embodiments of the present invention uniformly represent local and distributed resources to a virtual machine. These resources may be interchanged while a virtual machine is running in a transparent manner to the virtual machine. Accordingly, embodiments of the present invention make it possible to isolate the individual components of a device emulation stack, while providing effective performance for any particular device emulation resource pairing and allowing components to be reused through shared queue linkage of mixed and matched elements.

The elements making this level of abstraction possible are the universal transport mechanism and the extended abstract bus with built in authorization manager 510. Since the authorization manager 510 is a system management entity, additional capabilities such as the substitution of device emulation modules and subsequent routing are possible.

The uniform virtual transport mechanisms and the interplay between the virtual transport and the discovery mechanism allow for the seamless substitution of queue protocols where needed. Universal virtual transport implementations include support of a variety of queue protocol libraries. These libraries take hardware or software based queue formats and map them to a set of virtual transport specific commands for reading, writing, signaling, and waiting etc. Libraries for queue support reside within the virtual machine and within the compile environments of virtual transport device emulations. This allows for an enchanced level of mixing and matching of individual components while delivering high level performance in end-to-end implementations.

In one embodiment, virtual transport can model dynamic system topological changes and methods of data transport, making it possible to wrap all systems of transport with a common mechanism. Based on the architecture and implementation of virtual transport, it is possible to dynamically shift an underlying resource associated with a device provisioned for a virtual machine from 1) a local bus attached physical entity to 2) a resource available through a packet switched network. This switch may be accomplished within the authorization manager 510. Embodiments of the present invention are operable to integrate bus and network routing. Such automatic routing is an important element for tight integration of virtual mediated resources in a distributed data center. In one embodiment, this integration allows management of quality of service (QoS) across remote connections and facilitates fail-over and exception handling. The conversion can take place on a running virtual machine and is transparent above the level of the virtual transport device discovery mechanism. Since the virtual transport abstracts network devices as transport objects, routing is supported as a unified transport management function. The abstractions make it possible to track throughput and latency from endpoint to endpoint.

Embodiments of the present invention allow for a number of generic distributed device connection modules to be built for the virtual transport framework, including one for standard IP network connection. For example, a virtual transport emulated direct disk device may have a means of connecting to a standard IP network connection module making it unnecessary to write from scratch an entire virtual transport emulated distributed disk implementation for the network. In this manner, emulations for fiber channel, SCSI, or other protocols can share the common transport module when accessing storage across an IP network connection.

Embodiments of the present invention further support remoting of devices when a virtual machine is migrated. For example, if virtual machine 540 is communicatively coupled to hypervisor 502 and uses hardware resource 524, when virtual machine 540 is migrated and is now communicatively coupled to hypervisor 504, virtual machine 540 may continue to use hardware resource 524 via virtual transport manager 530.

Virtual transport bus module 506 consults the authorization manager 510 when a device plugging request or device instantiation request is received. Authorization records 512 can include network topology and routing information. If one of the endpoints (e.g., service endpoint) is remote, authorization records 512 will have the information needed to direct the communication path to the remote resource.

Authorization records 512 are updated by authorization manager 510 when either endpoint of an existing authorization record is moved (e.g., a virtual machine migration or local or remote resource substitution). Embodiments of the present invention thus shield virtual machines from changes of the end points. In one embodiment, the virtual transport bus module 506 of hypervisor 502 may be involved to the extent that hypervisor 502 may call a bridge device for connection with the provisioning record information rather than connecting to a local guest or the hypervisor local resources.

For example, a virtual machine may be using storage directly attached to the platform (e.g., computing system executing the hypervisor providing resources to the virtual machine) on which the virtual machine resides. In this case, the virtual transport disk device communicates directly to the disk hardware or the disk driver. If the virtual machine is migrated via the management layer to another platform, the connection to the disk would now be across a network attaching the new and old platforms.

Migration of a virtual machine is a virtual data center level management activity supported by embodiments of the present invention as is resource remoting (e.g., transfer of resources usage to another computing system). At a virtual data center level, management resources of the data center are known. Virtual transport thus plays a role by identifying the device resources of individual platforms in a uniform way.

When a set of resources is determined upon for a virtual machine, authorization manger 510 is notified of the emulated devices (e.g., virtual transport device instances 518a-b) and corresponding backing resources (e.g., hardware resources 524 and 528) that are to be provisioned. As migration is initiated, virtual transport bus module 506 sends a suspend signal to virtual transport device instances 518a-b and data IO actions are completed. Then virtual transport device driver 552 goes into a suspended state.

In the case of a remote storage connection, the authorization manager 510 writes an authorization record for the migrated virtual machines 540's disk access device (e.g., virtual transport device instance 518b). This authorization record indicates an alternative device emulation implementation (e.g., virtual transport device instance 518a) and has a handle to the initialization record. Authorization manager 510 further updates the authorization record to reflect new routing of the alternative device emulation implementation.

At the time of provisioning, virtual transport bus module 506 signals authorization manager 510 for reconnection. In one embodiment, authorization manager 510 accesses the provisioning record and examines the distributed device configuration options. Authorization manager 510 accesses authorization records 512 and based on a match signals virtual transport bus module to load the alternate device emulation. The alternative device is placed in the virtual transport bus slots 508 and a resume command is signaled to virtual transport device driver 522. As part of the recovery, the virtual transport driver 552 goes through the extended discovery mechanism to recognize any queue differences. The device discovery mechanism that is triggered during resume or reconnection allows for the transparent switch between different queue protocols, enabling one device driver in virtual machine 540 to service a class of device emulations without the knowledge of the broader operating system on the virtual machine. In some cases, the optimal solution may involve a different underlying queue protocol. The virtual transport device driver 552 links the proper queue protocol library (e.g., virtual transport queue library) and continues to initialize and run as in the local case.

Exemplary Kernel based Virtual Machine (KVM) Configuration

Figure 7:
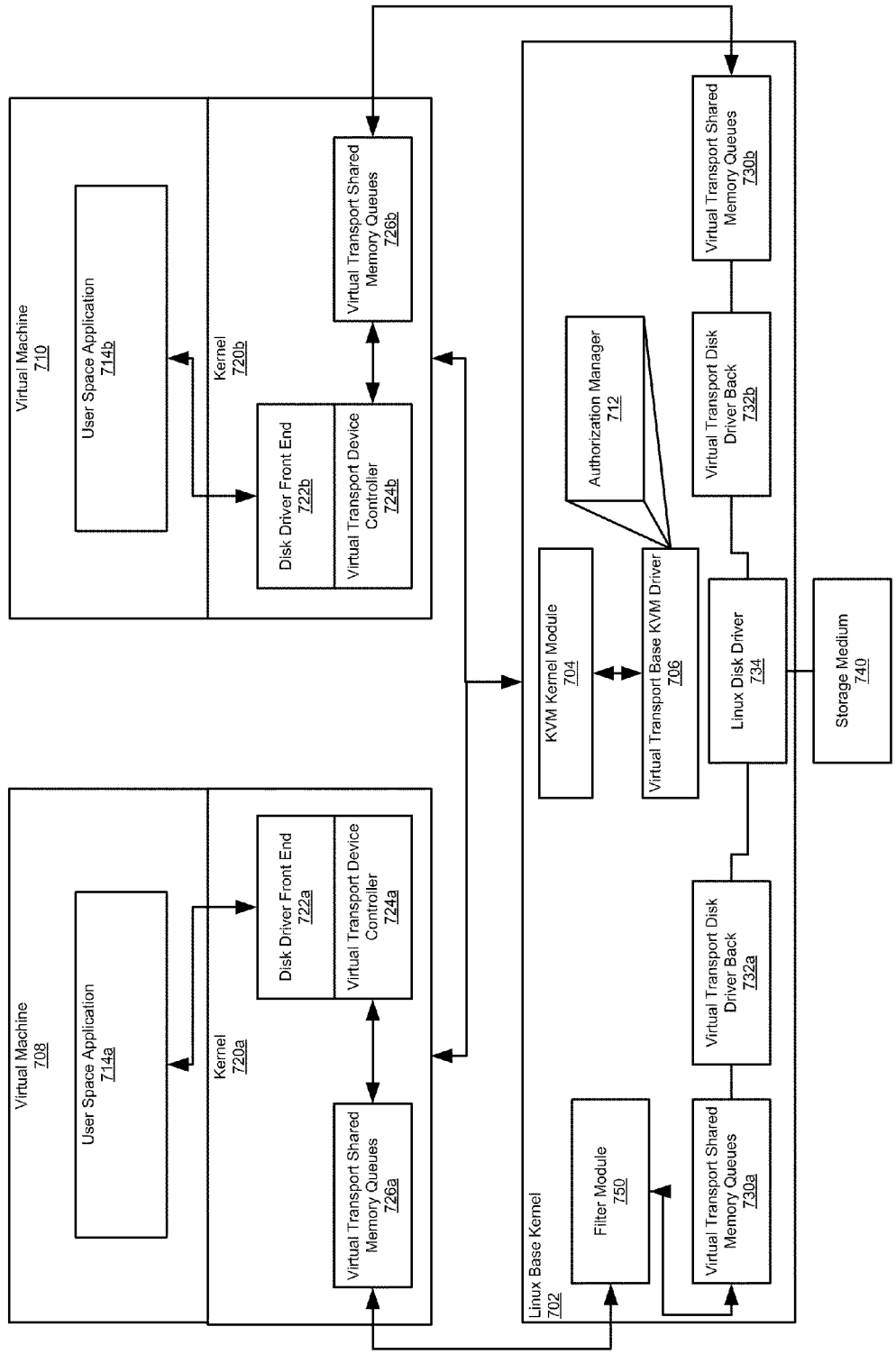
FIG. 7 shows a block diagram of exemplary kernel based virtual machine (KVM) and guest components, in accordance with another embodiment of the present invention.

FIG. 7 shows a block diagram of exemplary kernel based virtual machine (KVM) and guest components, in accordance with another embodiment of the present invention. Virtual machines 708 and 710 are communicatively coupled with Linux base kernel 702. In one embodiment, Linux base kernel 702 is operable to function as a hypervisor. Diagram 700 illustrates a KVM configuration with virtual machines 708 and 710 accessing a storage medium (e.g., disk driver, storage array, etc.) via Linux kernel base 702. It is appreciated that KVM embodiments may access a variety of hardware resources.

Virtual machines 708 and 710 include user space applications 714*a-b*, and kernels 720*a-b*. Kernels 720*a-b* include disk driver front ends 722*a-b*, virtual transport device controllers 724*a-b*, and virtual transport shared memory queues 726*a-b*. User space applications 714*a-b* send storage requests to disk driver front ends 722*a-b* which forward the requests to virtual transport device controllers 724*a-b*. Virtual transport device controllers 724*a-b* then send the storage requests to Linux base kernel 702 via virtual transport shared memory queues 726*a-b*. In one embodiment, Linux base kernel 702 is part of a trusted computing base.

Linux base kernel 702 includes KVM kernel module 704, virtual transport base KVM driver 706, virtual transport shared memory queues 730*a-b*, virtual transport backs 732*a-b*, Linux disk driver 734, and filter module 750. KVM kernel module 704 provides virtualization infrastructure for virtual transport based KVM driver 706 and virtual machines 708 and 710. In one embodiment, virtual transport base KVM driver 706 is a module downloadable into Linux base kernel 702 and communicates with Linux base kernel 702 resources and virtual transport components. Virtual transport base KVM driver 702 thus facilitates direct communication between emulated devices in Linux base kernel 702 and virtual machines 708 and 710. Virtual transport base KVM driver 706 thus acts as an intermediary between virtual machines 708-710 and KVM kernel module 704. Embodiments of the present invention are able to use interfaces of Linux base kernel 702 without use of KVM interfaces. In one embodiment, virtual transport base KVM driver 706 is operable to interface with a plurality of different hypervisors.

In one embodiment, user space applications 714*a-b* include virtual transport shared memory queues that can be used to bypass kernels 720*a-b* and signal KVM kernel module 704 where the requests are directed to storage medium 740. Bypassing kernels 720*a-b* may be done using of a callback from userspace.

Authorization manager 712 is operable to provide authorization of connection requests or instantiation requests thereby providing mandatory access control for communication connections. Authorization manager 712 is operable to perform functions related to security, provisioning, and filtering, as described herein. In one embodiment, filter module 750 was inserted via modification of an authorization record by authorization manager 712, as described herein.

Exemplary Processes

Figure 8:
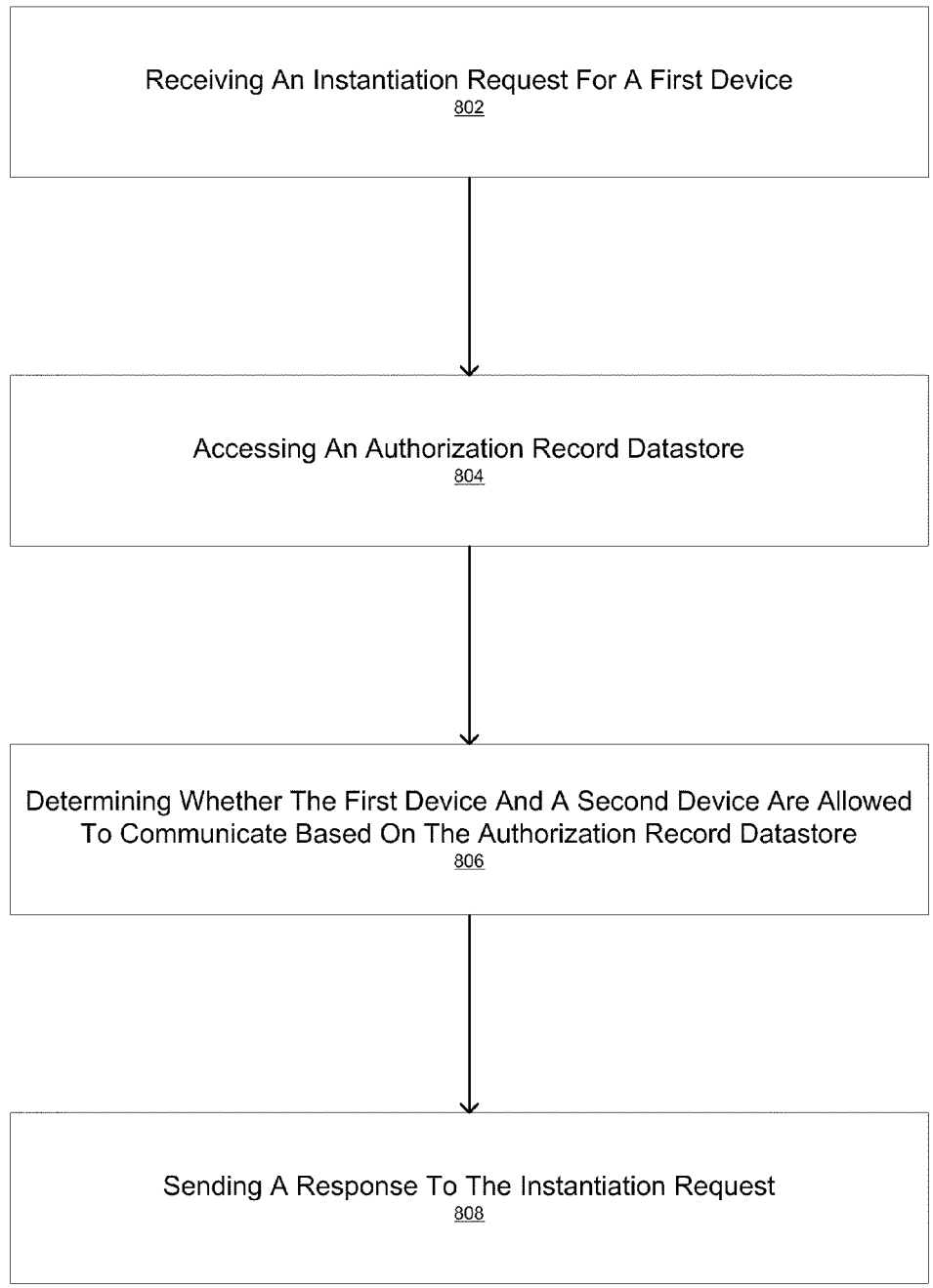
FIG. 8 shows an exemplary flowchart of computer controlled processes for facilitating communication in a virtual environment, in accordance with embodiments of the present invention.

FIG. 8 shows an exemplary flowchart of processes for facilitating communication in a virtual environment, in accordance with embodiments of the present invention. In one embodiment, the processes of flowchart 800 are performed by an authorization manager.

At block 802, an instantiation request is received for a first device. Authorization records can be created prior to starting a virtual machine as resources and a UUID are assigned to a virtual machine. The UUID identifies this unique guest in terms of what storage may be available to it, what basic devices are available to it, the size of memory that it needs and the state when in a non-running condition and in a non-instantiated state. In one embodiment, the UUID identifies the image of the virtual machine. As described herein, the instantiation request may include parameters such as the end points (e.g., virtual machines or a virtual machine and hypervisor based resource) and the device type (e.g., virtual transport message device or virtual transport disk device). The instantiation request may initiate from a virtual machine manager (e.g., virtual transport manager 206) or a task setting up virtual machines.

At block 804, an authorization record datastore is accessed. As described herein, the authorization record datastore may be accessed from a cache local to an authorization manager. The authorization datastore is created, manipulated, maintained, and cached at each of the platforms that have a virtual bus module.

At block 806, whether the first device and a second device are allowed to communicate based on the authorization record datastore is determined. The request for instantiation is checked against a cached version or other version of the authorization database. As described herein, the parameters of the instantiation request are checked against authorization records.

Authorization to communicate may be denied for a variety of reasons based on the characteristics of the endpoints. For example, where there is a loosely secured network with a low level for a particular virtual machine, the virtual machine may be denied access to that device based on the fact that security cannot be controlled enough once the virtual machine gets on the network. The two endpoints represent the basic levels of security that can be supported.

At block 808, a response to the instantiation request is sent. If there is an authorization record matching the instantiation request parameters, the instantiation request will be allowed, otherwise the instantiation request will fail. Where the instantiation request is authorized, the response allows completion of device instantiation and connection of the device to a virtual bus.

FIG. 9 shows an exemplary flowchart of processes for virtual device provisioning, in accordance with embodiments of the present invention. In one embodiment, the processes of flowchart 900 are performed by an authorization manager. The processes of flowchart 900 may be performed upon virtual machine migration or substitution (e.g., remoting) of resources.

At block 902, a notification of an emulated device operable to be provisioned is received within an electronic system.

At block 904, an authorization record of an authorization record datastore is updated. The updating of the authorization record comprises updating routing information related to communication of the emulated device and a virtual device. In one embodiment, the authorization record is cached local to the emulated device (e.g., in a hypervisor or trusted computing base). In one embodiment, the routing information reflects the routing at a local level since the caches is accessed at a local level for local action.

Embodiments of the present invention allow data to be streamed directly to the device or stream data directly to a channel that takes it off the platform and goes to the correct device. The channel could be a network, fiber channel, InfiniBand (IB) as long as the data is capable of being routed to the ultimate platform. As described herein, authorization records are used to facilitate routing, device insertion, auditing, compression, back up, virus filtering, and securing data streams by encryption.

At block 906, a request for instantiation or reconnection of the emulated device with the virtual device is received.

At block 908, it is determined whether the emulated device and the virtual device are allowed to communicate based on the authorization record datastore based on the existence and contents of a matching authorization record. As described herein, whether or not the authorization record is created and the exact nature of its contents depends on the respective security levels of the emulated device and the guest virtual device.

The emulated device can be disposed remotely from a virtual machine that is communicatively coupled to the virtual device. In one embodiment, the emulated device is operable to be provisioned based on a migration of a virtual machine. The emulated device and the guest virtual device further can be communicatively coupled via a shared memory queue. In one embodiment, the emulated device and the virtual device communicatively couple a first virtual machine and a second virtual machine.

At block 910, it is determined whether to insert a filter based on the authorization record. In one embodiment, the contents of the authorization record regarding filtering, and other authorization record contents, are based on the security dispositions of the two endpoints and the external policy made by the authorization manager at the time of the creation of the authorization record.

At block 912, a response to the request for instantiation or reconnection is sent. The emulated device may then load or reconnect and resume thereby providing access to the underlying resource.

FIG. 10 shows an exemplary flowchart of processes for setting up data filtering, in accordance with embodiments of the present invention. In one embodiment, the processes of flowchart 1000 are performed by an authorization manager.

At block 1002, an instantiation request for a first virtual device is received within an electronic system. As described herein, the instantiation request may be received by a virtual transport bus which sends the instantiation request to an authorization manager.

At block 1004, it is determined whether the first virtual device and a second virtual device are allowed to communicate based on an authorization record datastore. As described herein, the determination is performed by an authorization component operable to interface with a hypervisor and the authorization component is remote from the first virtual device.

At block 1006, an authorization record of the authorization record datastore is modified. In one embodiment, modifying the authorization record datastore includes setting an indicator of a data filtering module to filter communication between the first virtual device and the second virtual device.

The authorization record may be cached local to the first virtual device. The data filtering module may be able to perform a variety of filtering operations. For example, the data filtering module is operable to compress data, encrypt data, audit data, perform virus filtering and perform a backup.

In one embodiment, authorization record modification is performed based on respective security levels of the first virtual device and the second virtual device. For example, if there is level three security on a hypervisor and level one at the virtual machine and auditing may be required, then auditing could be inserted based on the fact that the authorization manager recognizes two different security levels and thus there is a need to audit the data.

At block 1008, a response to the instantiation request is sent. As described herein, sending the response to the instantiation request is used to plug a device or initiate communication thereby beginning filtering of the data.

Figure 11:
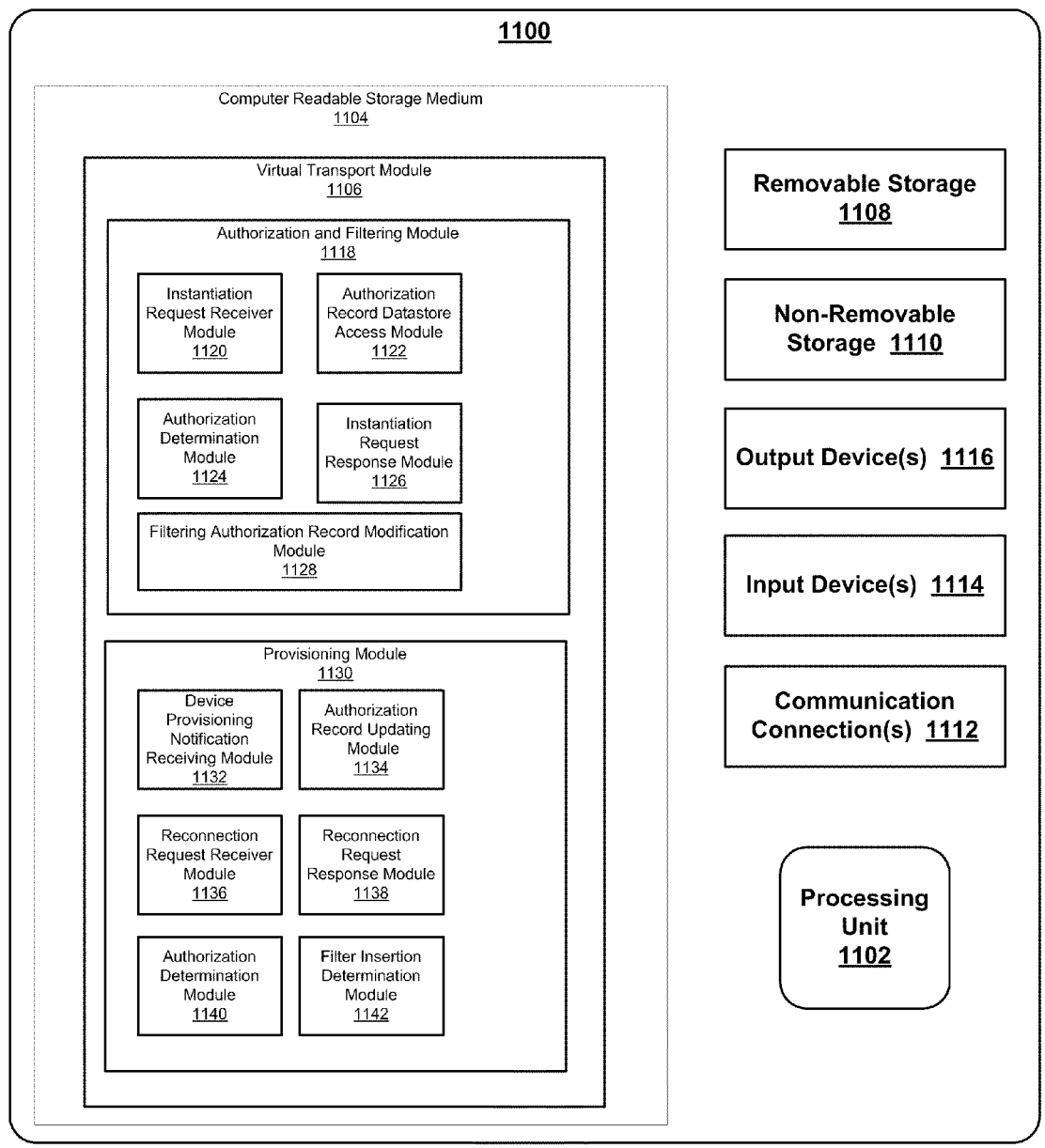
FIG. 11 shows a block diagram of an exemplary computer system, in accordance with one embodiment of the present invention.

FIG. 11 shows a block diagram of an exemplary computer system module 1100, in accordance with one embodiment of the present invention. With reference to FIG. 11, an exemplary system module for implementing embodiments described herein and includes a general purpose computing system environment, such as computing system environment 1100. Computing system environment 1100 may include, but is not limited to, servers (e.g., servers 106a-c), desktop computers, laptops, tablet PCs, mobile devices, and smartphones. In its most basic configuration, computing system environment 1100 typically includes at least one processing unit 1102 and computer readable storage medium 1104. Depending on the exact configuration and type of computing system environment, computer readable storage medium 1104 may be volatile (such as RAM), non-volatile (such as ROM, flash memory, etc.) or some combination of the two. Portions of computer readable storage medium 1104 when executed facilitate authorization, provisioning, and filtering of communication in virtual environments (e.g., processes 800, 900, and 1100).

Additionally, computing system environment 1100 may also have additional features/functionality. For example, computing system environment 1100 may also include additional storage (removable and/or non-removable) including, but not limited to, magnetic or optical disks or tape. Such additional storage is illustrated in FIG. 10 by removable storage 1108 and non-removable storage 1110. Computer storage media includes volatile and nonvolatile, removable and non-removable media implemented in any method or technology for storage of information such as computer readable instructions, data structures, program modules or other data. Computer readable medium 1104, removable storage 1108 and nonremovable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1100. Any such computer storage media may be part of computing system environment 1100.

Computing system environment 1100 may also contain communications connection(s) 1112 that allow it to communicate with other devices. Communications connection(s) 1112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 1112 may allow computing system environment 1100 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1112 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 1100 may also have input device(s) 1114 such as a keyboard, mouse, pen, voice input device, touch input device, remote control, etc. Output device(s) 1116 such as a display, speakers, etc. may also be included. All these devices are well known in the art and are not discussed at length.

In one embodiment, computer readable storage medium 1104 includes virtual transport module 1106 which includes authorization and filtering module 1118 and authorization and provisioning module 1130.

Authorization and filtering module 1118 includes instantiation request receiver module 1120, authorization record datastore access module 1122, authorization determination module 1124, instantiation request response module 1126, and filtering authorization record modification module 1128. Instantiation request receiver module 1120 is operable to receive instantiation requests, as described herein. Authorization record datastore access module 1122 is operable to access authorization record datastores (e.g., locally cached or remote). Authorization determination module 1124 determines whether virtual devices are allowed to communicate and whether filtering is necessary if the virtual devices are to communicate. Instantiation request response module 1126 sends responses (e.g., from authorization determination module 1124) to instantiation requests (e.g., to virtual bus module 506). Filtering authorization record modification module 1128 is operable to modification authorization records to reflect insertion of filters, as described herein.

Authorization and provisioning module 1130 includes device provisioning notification receiving module 1132, authorization record updating module 1134, reconnection request receiver module 1136, reconnection request response module 1138, authorization determination module 1140, and filter insertion determination module 1142. Device provisioning notification receiving module 1132 is operable to receive notifications of the devices to be provisioned, as described herein. Authorization record updating module 1134 is operable to update authorization records to reflect device provisioning. Reconnection request receiver module 1136 is operable to receive reconnection requests (e.g., after update of authorization records for provisioning). Reconnection request response module 1138 is operable to send a response to a reconnection request (e.g., based on results of authorization determination module 1140). Authorization determination module 1140 is operable to determine whether a reconnection of virtual devices is authorized. Filter insertion determination module 1142 is operable to determine whether filter insertion is to be performed.

Figure 12:
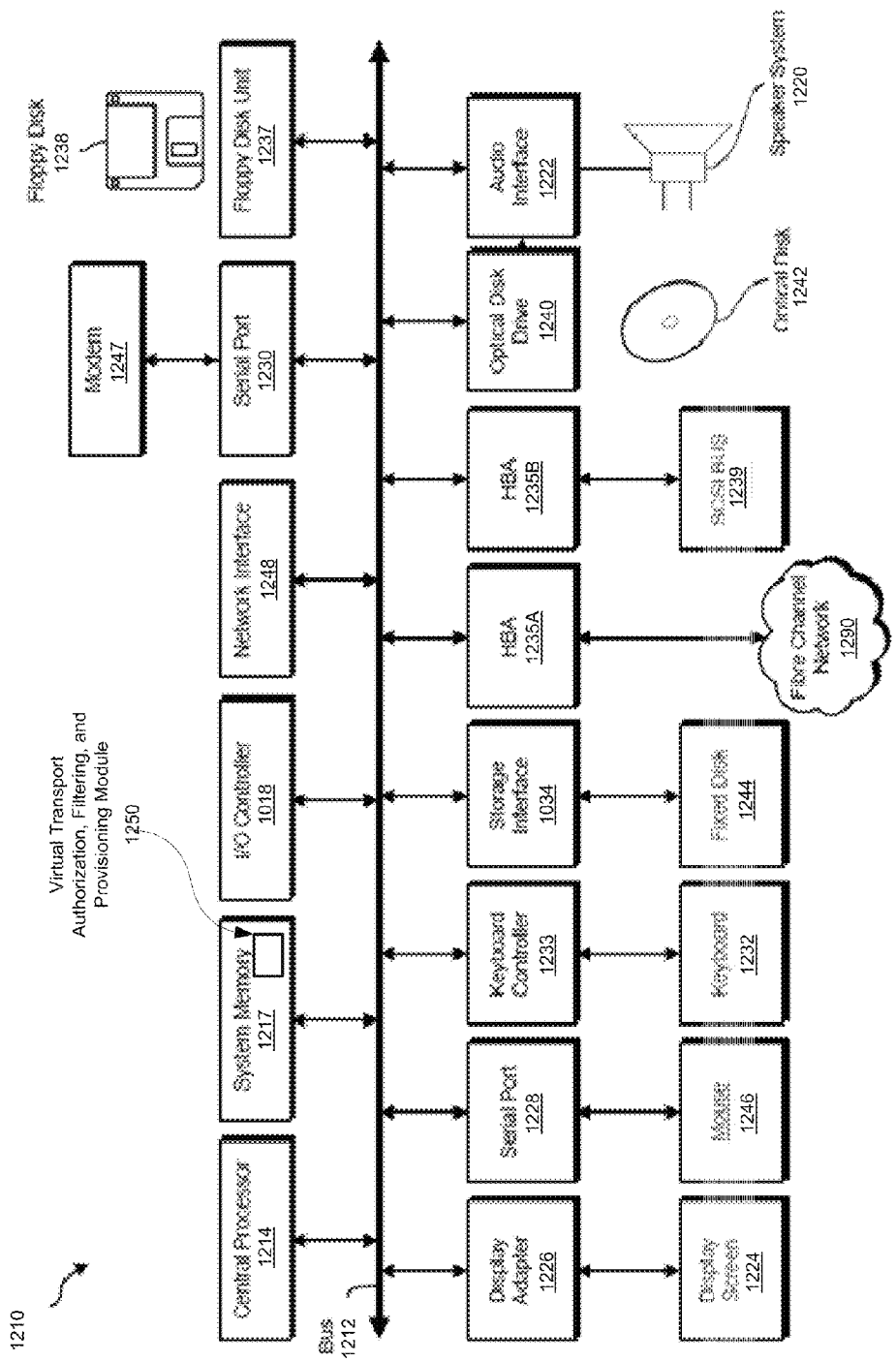
FIG. 12 shows a block diagram of another exemplary computer system, in accordance with one embodiment of the present invention.

FIG. 12 shows a block diagram of another exemplary computer system, in accordance with one embodiment of the present invention. FIG. 12 depicts a block diagram of a computer system 1210 (e.g., servers 106*a-c*) suitable for implementing the present disclosure as described herein. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212). System memory 1217 includes virtual transport authorization, filtering, and provisioning module 1250 which is operable to facilitate authorization checking, data filtering, and provisioning of virtual devices on virtual environments.

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present disclosure. The devices and subsystems can be interconnected in different ways from that shown in FIG. 12. The operation of a computer system such as that shown in FIG. 12 is readily known in the art and is not discussed in detail in this application. Code to implement the present disclosure can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Thus, embodiments of the present invention provide a mechanism and method to authorize, provision, and filter virtual device communication. The authorization provides dynamic security and mandatory access control. The provisioning is transparent devices thereby allowing dynamic provisioning. The filtering allows a variety of data filtering function to be applied in a manner transparent to the virtual devices.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for setting up data filtering comprising:
receiving, within an electronic system, an instantiation request for a first virtual device running on a hypervisor;
determining whether said first virtual device and a second virtual device running on the hypervisor are allowed to communicate via a virtual transport bus comprising at least one shared memory queue based on an authorization record datastore;
modifying an authorization record of said authorization record datastore based on respective security levels of said first virtual device and said second virtual device, wherein said modifying comprises setting an indicator of a data filtering module, communicatively coupled to the hypervisor and the at least one shared memory queue, to filter communications between said first virtual device and said second virtual device over the virtual transport bus; and
sending a response to said instantiation request,
wherein said indicator indicates a point of a plurality of points along a data path of the at least one shared memory queue between said first virtual device and said second virtual device at which said data filtering module is to filter the communications between said first virtual device and said second virtual device.

2. The method of claim 1 further comprising caching said authorization record local to said first virtual device.

3. The method of claim 1 wherein said determining is performed by an authorization component operable to interface with a hypervisor and said authorization component is remote from said first virtual device.

4. The method of claim 1 wherein said data filtering module is operable to compress data.

5. The method of claim 1 wherein said data filtering module is operable to encrypt data.

6. The method of claim 1 wherein said data filtering module is operable to audit data.

7. A non-transitory computer readable storage medium having stored thereon, computer executable instructions that, when executed by a computer system cause the computer system to perform a method of providing storage information said method comprising:
receiving an instantiation request for a first virtual device running on a hypervisor;
determining whether said first virtual device and a second virtual device running on the hypervisor are allowed to communicate via a virtual transport bus comprising at least one shared memory queue based on an authorization record datastore;
modifying an authorization record of said authorization record datastore based on respective security levels of said first virtual device and said second virtual device, wherein said modifying comprises setting an indicator of a data filtering module, communicatively coupled to the hypervisor and the at least one shared memory queue, to filter communications between said first virtual device and said second virtual device over the virtual transport bus; and
sending a response to said instantiation request,
wherein said indicator indicates a point of a plurality of points along a data path of the at least one shared memory queue between said first virtual device and said second virtual device at which said data filtering module is to filter the communications between said first virtual machine and said second virtual machine.

8. The non-transitory computer readable storage medium of claim 7 wherein said method further comprises caching said authorization record local to said first virtual device.

9. The non-transitory computer readable storage medium of claim 7 wherein said determining is performed by an authorization component operable to interface with a hypervisor and wherein said authorization component is remote from said first virtual device.

10. The non-transitory computer readable storage medium of claim 7, wherein said data filtering module is operable to compress data.

11. The non-transitory computer readable storage medium of claim 7, wherein said data filtering module is operable to encrypt data.

12. The non-transitory computer readable storage medium of claim 7, wherein said data filtering module is operable to audit data.

13. A storage cluster system, comprising:
a computer system comprising one or more processors coupled to a computer readable storage media and configurable to execute computer readable code stored on the computer readable storage media which causes the computer system to implement a method comprising:
receiving an instantiation request for a first virtual device running on a hypervisor;
determining whether said first virtual device and a second virtual device running on the hypervisor are allowed to communicate via a virtual transport bus comprising at least one shared memory queue based on an authorization record datastore;
modifying an authorization record of said authorization record datastore based on respective security levels of said first virtual device and said second virtual device, wherein said modifying comprises setting an indicator of a data filtering module, communicatively coupled to the hypervisor and the at least one shared memory queue, to filter communications between said first virtual device and said second virtual device over the virtual transport bus; and
sending a response to said instantiation request,
wherein said indicator indicates a point of a plurality of points along a data path of the at least one shared memory queue between said first virtual device and said second virtual device at which said data filtering module is to filter the communications between said first virtual machine and said second virtual machine.

14. The storage cluster system of claim 13, wherein said method further comprises caching said authorization record local to said first virtual device.

15. The storage cluster system of claim 13, wherein said determining is performed by an authorization component operable to interface with a hypervisor and said authorization component is remote from said first virtual device.

16. The storage cluster system of claim 13, wherein said data filtering module is operable to compress data.

17. The storage cluster system of claim 13, wherein said data filtering module is operable to encrypt data.

* * * * *